United States Patent [19]

Hamering

[11] Patent Number: 4,723,162

[45] Date of Patent: Feb. 2, 1988

[54] TELEVISION CAMERA HAVING AN ELECTRONIC VIEWFINDER WITH A SOUND-LEVEL INDICATOR

[75] Inventor: Johannes G. Hamering, Breda, Netherlands

[73] Assignee: U.S. Philips Corporation, New York, N.Y.

[21] Appl. No.: 899,858

[22] Filed: Aug. 25, 1986

[30] Foreign Application Priority Data

Sep. 26, 1985 [NL] Netherlands .................. 8502623

[51] Int. Cl.$^4$ .................. H04N 17/00; H04N 5/50; H04N 5/60
[52] U.S. Cl. .................. 358/139; 358/192.1; 358/198; 340/722
[58] Field of Search ............ 358/224, 139, 183, 192.1, 358/198; 340/722

[56] References Cited

U.S. PATENT DOCUMENTS

| | | | |
|---|---|---|---|
| 2,180,944 | 11/1939 | Linsell | 358/129.1 |
| 3,435,136 | 3/1969 | Bachmann et al. | 358/224 |
| 3,502,804 | 3/1970 | Barr | 358/224 |
| 4,577,188 | 3/1986 | Inami et al. | 340/722 |

*Primary Examiner*—Howard W. Britton
*Assistant Examiner*—John K. Peng
*Attorney, Agent, or Firm*—Marc D. Schechter

[57] ABSTRACT

The display screen of an electronic viewfinder displays camera setting information components outside the screen image, so that a camera operator can check the camera settings and possibly modify them to desired values without having to look away from the scene image. In the camera according to the invention, the sound recording level is displayed in the viewfinder as a bar whose length varies logarithmically. A stable presentation of the sound recording level is the result.

8 Claims, 1 Drawing Figure

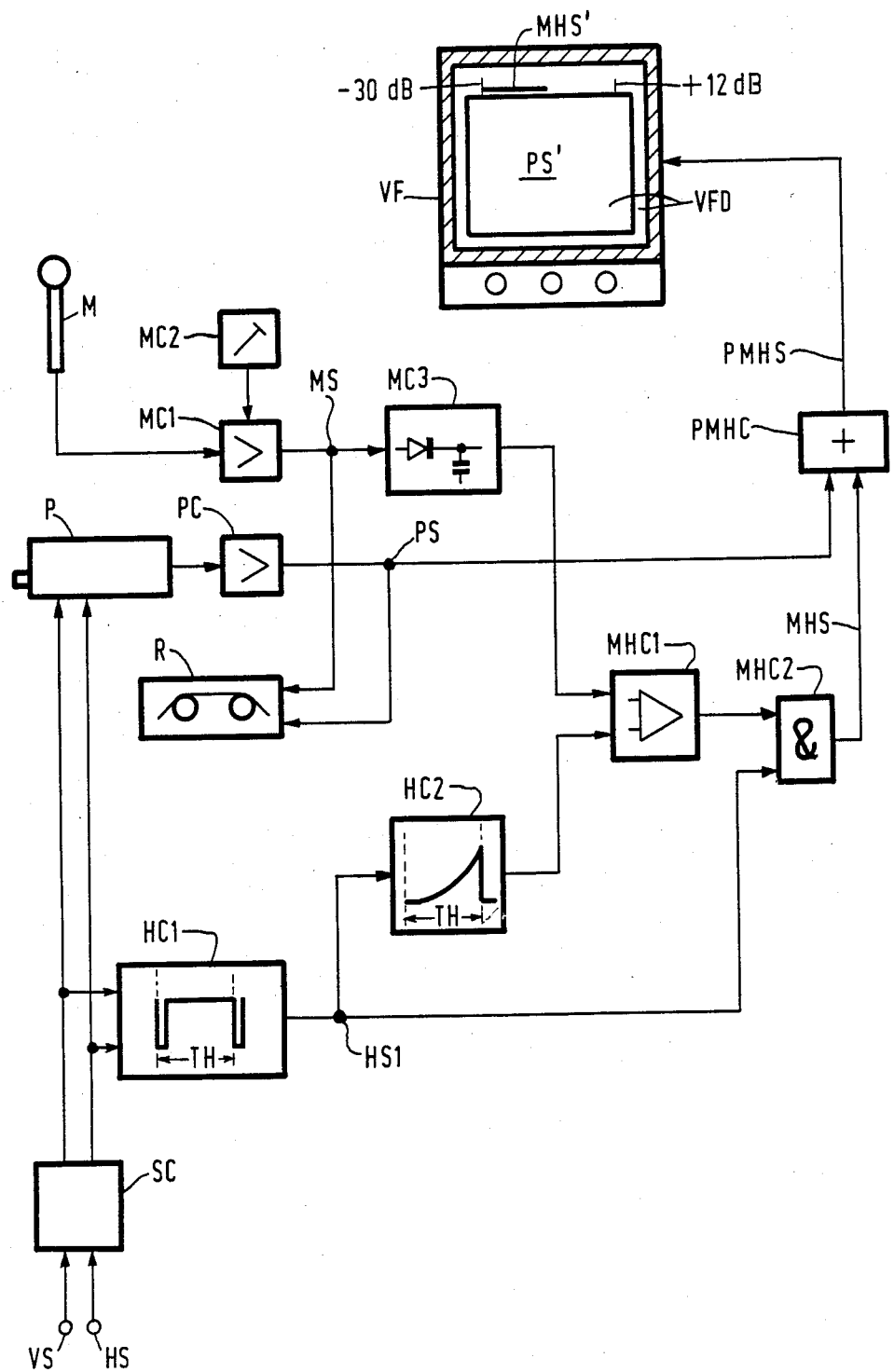

TELEVISION CAMERA HAVING AN ELECTRONIC VIEWFINDER WITH A SOUND-LEVEL INDICATOR

BACKGROUND OF THE INVENTION

The invention relates to a television camera having an electronic viewfinder. Information about the setting of the camera is displayed on the viewfinder display screen outside a display of the image image to be picked up.

A television camera of this type is described in U.S. Pat. No. 3,435,136. This Patent describes that the diaphragm aperture and the focal length of the lens can be set by the camera operator and can be displayed as setting information on the viewfinder display screen. The setting information is displayed on the screen in the form of a luminescent square which is movable along a scale. This gives the camera operator the lens setting information to be readjusted if required without having to look away from the viewfinder image displaying the scene to be picked up by the camera.

SUMMARY OF THE INVENTION

It is an object of the invention to provide a television camera in which the camera operator can observe different setting information in the viewfinder display screen. To this end a television camera according to the invention displays setting information relating to the sound recording level at which the sound associated with a scene to be picked up is recorded and processed by a camera microphone circuit. The strength of the sound recording level is displayed in the form of a variable-length bar having a logarithmic variation.

To obtain a sound recording level bar displaying optimum setting information and located in the television line scan direction, in one embodiment the camera includes a sound signal peak detection circuit. An output of the peak detection circuit is coupled to an input of a signal comparison circuit. Another input of the comparison circuit is coupled to an output of a logarithmic voltage generator for supplying a voltage logarithmically varying over a part of a line period. An output of the signal comparison circuit is coupled to an input of a gating circuit. Another input of the gating circuit is coupled to an output of a line selection circuit for selecting at least one television line per field period. An output of the gating circuit supplies a sound recording level indication signal and is coupled to an input of a signal combination circuit. Another input of the signal combination circuit receives a picture or video signal to be displayed by the viewfinder. An output of the signal combination circuit carries the picture or the video signal and the sound recording level indication signal and is coupled to an input of the viewfinder.

In another embodiment displaying clear setting information on the viewfinder display screen, the sound recording level bar comprises corresponding parts of two consecutive television lines per picture or frame.

BRIEF DESCRIPTION OF THE DRAWING

The drawing is a block diagram of a television camera according to the invention.

DESCRIPTION OF THE PREFERRED EMBODIMENTS

In the drawing, the reference P denotes an image sensor and M denotes a microphone which form part of a television camera as picture imaging and sound pickup devices. The camera may be suitable for black and white television or color television, with interlaced or non-interlaced television fields per frame or picture.

The image sensor P may be a single or several imaging devices. Each device may be an imaging tube or a solid-state image sensor. Independent of the choice, it is assumed that the image sensor P operates with television rasters formed from lines under the control of a field and line signal generator SC. For synchronizing purposes, a field or a line synchronizing signal VS or HS is applied to the generator SC.

A picture or video signal PS is available in the camera for further signal processing via a signal amplifier PC coupled to a picture or video signal output of the image sensor P. The signal PS comprises picture information PS' to be displayed, and field and line synchronizing and blanking information in the case of a video signal structure. The signal PS is a single picture signal or a composite video signal. The video signal indication will further be used in the course of this description.

The microphone M is shown schematically by a single microphone. In the case of stereo sound recording, there may be two or more microphones. The microphone M is succeeded by a sound signal amplifier MC1 which supplies a sound signal MS at an output. The sound recording level during sound recording is controlled at the amplifier MC1 by using a sound control member MC2. The sound control member MC2 can be operated by a cameraman, so that a camera microphone circuit (M, MC1, MC2) supplies the sound signal MS at the desired sound level.

The signals PS and MS are applied in the camera to a signal storage and reproducing device R which may accommodate a tape or a record for this purpose. The presence of the device R in the camera leads to a construction as a television camera recorder.

An electronic viewfinder VF is also part of the camera. A display screen VFD displays a viewfinder image with the picture information PS'. The setting information MHS' is displayed outside this viewfinder image.

The setting information MHS' is shown as a bar which luminesces against a dark background and extends in the television line scan direction (i.e. the horizontal direction) from −30 dB on the left to +12 dB on the right. The control range of 42 dB is associated with the sound recording level control at the camera microphone circuit (M, MC1, MC2) by the sound control member MC2.

To obtain the setting information on the viewfinder screen VFD in the form of the sound recording level bar MHS', the camera has the following structure. The sound signal MS is applied via a sound signal peak detection circuit MC3 to an input of a signal comparison circuit MHC1.

To clarify the operation of the circuit MC3, a diode and a subsequent capacitor ensuring the peak rectification are shown in this circuit by way of example. The charge time constant of the capacitor is assumed to be smaller than the discharge time constant. The circuit MC3 supplies a signal at the maximum sound level. The signal increases quickly but falls more slowly, which in practice reduces oscillations in the displayed setting information MHS'.

The outputs of the field and line signal generator SC are coupled to inputs of a line selection circuit HC1 in which a line signal is shown with a television line period TH. It is assumed that the line selection circuit HC1 selects one line per field period, for example the last line which occurs in the television field blanking period.

The reference HS1 denotes the line selection signal. This signal is applied on the one hand to an input of a logarithmic voltage generator HC2 and on the other hand to an input of a gating circuit MHC2.

A voltage curve increasing logarithmically over a part of the line period TH is shown at the generator HC2. The signal comparison circuit MHC1 is shown as an amplifier having two inputs. It is assumed that the output of the circuit MHC1 supplies a higher voltage corresponding to a logic 1 while the voltage at the output of the circuit MC3 is higher than that at the output of the generator HC2. However, when the logarithmic voltage passes the voltage at the output of the sound signal peak detection circuit MC3 the comparison circuit MHC1 supplies a lower voltage corresponding to a logic 0.

The output of the circuit MHC1 (initially logic 1 and after some time depending on the value of the maximum sound level, logic 0) is coupled to an input of a gating circuit MHC2. Another input of the gating circuit MHC2 is coupled to the output of the line selection circuit HC1. The gating circuit MHC2 operates with a logic AND function so that, starting from the voltage values described and shown, the output of the gating circuit MHC2 is initially logic 1 during the selected line period and subsequently becomes logic 0 at a time dependent on the maximum sound level. The circuit MHC2 thereby supplies a sound recording level indication signal MHS.

The output of the gating circuit MHC2 with the signal MHS is coupled to an input of a signal combination circuit PMHC. Another input of combination circuit PMHC is coupled to the output of the signal amplifier PC supplying the video signal PS. The signal combination circuit PMHC shown as an adder circuit supplies a combination signal PMHS which is applied to the viewfinder VF. Consequently, the viewfinder image contains the picture information PS' and the setting information, which is located outside this picture and has the form of the sound recording level bar MHS' luminescing against a dark background.

It is found in practice that it is sufficient to form the sound recording level bar MHS' from two consecutive television lines per interlaced picture or frame. If more television lines are used to obtain a greater bar width, the line selection signal HS1 should comprise the last lines of the field blanking period.

The display on the viewfinder screen VFD of the sound recording level in the form of the bar MHS' gives an optimum presentation of the sound level. Further camera setting information components in the form of luminescing squares may also be displayed in known manner.

The optimum presentation of the sound recording level is obtained by varying the bar length logarithmically. In the given embodiment of the camera, the logarithmically varying bar length represents the maximum sound level. Instead, the bar length could represent the average sound level. In this case, the signal peak detection circuit MC3 would be replaced by a signal-intergrating circuit. In practice the presentation of the maximum sound level as setting information appears to be preferred.

What is claimed is:
1. A television camera comprising:
   an image sensor for generating an image signal corresponding to a view of a scene;
   an electronic viewfinder for receiving the image signal and for displaying an image corresponding to the view of the scene;
   means for receiving sound from the scene and for generating a sound signal corresponding to the sound received;
   means for generating a bar signal and for adding the bar signal to the image signal, the bar signal generating an image of a bar in the viewfinder outside the image corresponding to the view of the scene, said bar image having a length which is a linear function of the logarithm of the sound signal.

2. A television camera as claimed in claim 1, characterized in that:
   the camera further includes means for receiving the sound signal and for producing an output signal proportional to the peak sound signal; and
   the bar signal is a linear function of the logarithm of the peak sound signal.

3. A television camera as claimed in claim 2, characterized in that the means for generating the bar signal comprises:
   means for generating a logarithmic voltage having a value V at any point in time T, where T is a linear function of the logarithm of V; and
   means for comparing the sound signal with the logarithmic voltage and for producing a comparison signal at least when the sound signal is equal to the logarithmic voltage.

4. A television camera as claimed in claim 3, characterized in that:
   the viewfinder display comprises a plurality of lines; and
   the means for generating the bar signal further comprises:
   means for producing a line-selection signal during at least one television line of the electronic viewfinder; and
   means for producing a sound level indicating signal in response to the line-selection signal and the comparison signal.

5. A television camera as claimed in claim 4, characterized in that the means for producing the sound level indicating signal comprises an AND gate.

6. A television camera as claimed in claim 1, characterized in that the means for generating the bar signal comprises:
   means for generating a logarithmic voltage having a value V at any point in time T, where T is a linear function of the logarithm of V; and
   means for comparing the sound signal with the logarithmic voltage and for producing a comparison signal at least when the sound signal is equal to the logarithmic voltage.

7. A television camera as claimed in claim 6, characterized in that:
   the viewfinder display comprises a plurality of lines; and
   the means for generating the bar signal further comprises:
   means for producing a line-selection signal during at least one television line of the electronic viewfinder; and
   means for producing a sound level indicating signal in response to the line-selection signal and the comparison signal.

8. A television camera as claimed in claim 7, characterized in that the means for producing the sound level indicating signal comprises an AND gate.

* * * * *